(12) United States Patent
Wang et al.

(10) Patent No.: US 11,747,458 B2
(45) Date of Patent: Sep. 5, 2023

(54) FREQUENCY-CONVERTED FREQUENCY-MODULATED SELF-INJECTION-LOCKED RADAR

(71) Applicant: NATIONAL SUN YAT-SEN UNIVERSITY, Kaohsiung (TW)

(72) Inventors: Fu-Kang Wang, Kaohsiung (TW); Pin-Hsun Juan, Kaohsiung (TW); Chao-Kai Wen, Kaohsiung (TW); De-Ming Chian, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 219 days.

(21) Appl. No.: 17/197,132

(22) Filed: Mar. 10, 2021

(65) Prior Publication Data

US 2022/0196819 A1 Jun. 23, 2022

(30) Foreign Application Priority Data

Dec. 18, 2020 (TW) .................................. 109145079

(51) Int. Cl.
*G01S 13/34* (2006.01)
*G01S 7/35* (2006.01)

(52) U.S. Cl.
CPC ............ *G01S 13/341* (2013.01); *G01S 7/358* (2021.05)

(58) Field of Classification Search
CPC .. G01S 13/34–348; G01S 7/358; G01S 7/356; G01S 7/03
See application file for complete search history.

(56) References Cited

U.S. PATENT DOCUMENTS 9,423,496 B2* 8/2016 Horng ................... G01S 13/08
10,281,561 B2* 5/2019 Wang ...................... H03L 7/24
(Continued)

FOREIGN PATENT DOCUMENTS

TW 201927233 A 7/2019

OTHER PUBLICATIONS

F.-K. Wang et al. "Detection of Concealed Individuals Based on Their Vital Signs by Using a See-Through-Wall Imaging System With a Self-Injection-Locked Radar," in IEEE Transactions on Microwave Theory and Techniques, vol. 61, No. 1, pp. 696-704, Jan. 2013, doi: 10.1109/TMTT.2012.2228223. (Year: 2013).*

(Continued)

*Primary Examiner* — Matthew M Barker
(74) *Attorney, Agent, or Firm* — Demian K. Jackson; Jackson IPG PLLC

(57) ABSTRACT

A FCFMSIL radar includes a SILO, a frequency conversion unit, an antenna unit, a demodulation unit and a processing unit. The frequency conversion unit converts an oscillation signal of the SILO into a FMCW signal. The antenna unit transmits the FMCW signal to an area as a transmitted signal and receives a reflected signal from the area as a received signal. The frequency conversion unit converts the received signal into an injection signal and injects it into the SILO. The demodulation unit demodulates the oscillation signal into an in-phase demodulated signal and a quadrature demodulated signal. The processing unit processes the in-phase and the quadrature demodulated signals to obtain a baseband signal and thus acquire a phase and a frequency of a tone in the frequency-domain baseband signal, and determines the tone corresponding to one or multiple objects based on the phase and frequency of the tone.

10 Claims, 3 Drawing Sheets

(56) References Cited

U.S. PATENT DOCUMENTS

| | | | |
|---|---|---|---|
| 10,763,872 B1* | 9/2020 | Wang | G01S 13/88 |
| 11,360,189 B2* | 6/2022 | Horng | H03L 7/24 |
| 2012/0209087 A1* | 8/2012 | Horng | G01S 13/87 |
| | | | 600/301 |
| 2017/0102457 A1 | 4/2017 | Li et al. | |
| 2018/0083358 A1* | 3/2018 | Wang | G01S 13/87 |
| 2018/0224526 A1 | 8/2018 | Wang et al. | |
| 2020/0158858 A1* | 5/2020 | Tseng | G01S 7/358 |
| 2020/0295770 A1 | 9/2020 | Wang et al. | |
| 2021/0109208 A1* | 4/2021 | Horng | G01S 7/415 |
| 2021/0302558 A1* | 9/2021 | Peng | G01S 13/58 |
| 2021/0341595 A1* | 11/2021 | Yu | G01S 7/352 |
| 2022/0146624 A1* | 5/2022 | Wang | G01S 7/354 |

OTHER PUBLICATIONS

Taiwanese Notice of Allowance dated Jul. 11, 2022 for Taiwanese Patent Application No. 109145079, 3 pages.
Fu-Kang Wang et al., Multiple Range and Vital Sign Detection Based on Single-Conversion Self-Injection-Locked Hybrid Mode Radar With a Novel Frequency Estimation Algorithm, IEEE Transactions on Microwave Theory and Techniques, Feb. 3, 2020.
Taiwanese Office Action dated Jun. 2, 2021 for Taiwanese Patent Application No. 109145079, 9 pages.

\* cited by examiner

FREQUENCY-CONVERTED FREQUENCY-MODULATED SELF-INJECTION-LOCKED RADAR

FIELD OF THE INVENTION

This invention generally relates to a self-injection-locked radar, and more particularly to a frequency-converted frequency-modulated self-injection-locked (FCFMSIL) radar.

BACKGROUND OF THE INVENTION

Self-injection-locked (SIL) radar, suitable for vital sign detection, is a detection radar having extremely high sensitivity to tiny vibration of subject because a voltage-controlled oscillator in the SIL radar is injected with and locked by a reflected signal from the subject to enter a self-injection-locked state. Nevertheless, the conventional SIL radar only can detect vital sign of a single subject owing to it estimates vibration frequency of the subject using frequency variation of the voltage-controlled oscillator in the self-injection-locked state.

Frequency-modulated continuous wave (FMCW) radar is a range radar provided to transmit a transmitted signal having a frequency varied over time and receive a reflected signal from an object. The reflected signal also has a frequency varied over time so that the frequency difference between the transmitted signal and the received signal can be used to estimate the distance from the FMCW radar to the object, and multiple object detection is available. Unfortunately, due to bandwidth restriction, the conventional FMCW radar has an insufficient range resolution. If there are more than one objects at similar range from the FMCW radar, they may be shown as the same tone in radar spectrum and unable to be distinguished.

In order to solve the bottleneck problem associated with vital sign detection of multiple subjects, many researchers try to combine the advantages of the SIL radar with high sensitivity to tiny vibration and the FMCW radar with ability of multi-object detection and try to improve the range resolution of the FMCW radar.

SUMMARY

The object of the present invention is to combine the advantages of the SIL radar and the FMCW radar to detect vital signs of multiple subjects because a frequency conversion unit is provided to convert and transmit an oscillation signal of a self-injection-locked oscillator (SILO) to an area and provided to convert and inject a received signal into the SILO. Furthermore, processing data scale can be reduced, operational efficiency, accuracy degree and range resolution can be improved in the FCFMSIL radar of the present invention because it can be known that tone in frequency-domain baseband signal is corresponding to one or multiple objects using the relation of frequency and phase of the tone.

A FCFMSIL radar of the present invention includes a self-injection-locked oscillator (SILO), a frequency conversion unit, an antenna unit, a demodulation unit and a processing unit. The SILO is configured to output an oscillation signal. The frequency conversion unit is coupled to the SILO to receive and convert the oscillation signal into a frequency-modulated continuous wave signal. The antenna unit is coupled to the frequency conversion unit to receive and transmit the frequency-modulated continuous wave signal to an area as a transmitted signal and receive a reflected signal from the area as a received signal. The frequency conversion unit is configured to receive and convert the received signal into an injection signal. The injection signal is configured to be injected into the SILO to make the SILO enter in a self-injection-locked state. The demodulation unit is coupled to the SILO to receive and demodulate the oscillation signal into an in-phase demodulated signal and a quadrature demodulated signal. The processing unit is coupled to the demodulation unit to receive the in-phase demodulated signal and the quadrature demodulated signal, configured to process the in-phase demodulated signal and the quadrature demodulated signal to obtain a baseband signal, configured to perform a spectrum analysis on the baseband signal to acquire a phase and a frequency of at least one tone of the frequency-domain baseband signal, and configured to determine the at least one tone is corresponding to one object or a plurality of objects based on the phase and the frequency of the at least one tone.

The processing unit of the present invention is provided to perform a spectrum analysis of the baseband signal to acquire the frequency and the phase of each of the tones in the frequency-domain baseband signal, and it is provided to confirm whether each of the tones is corresponding to a single object based on the relation of the frequency and the phase of each of the tones. Even if the tone is identified to be corresponding to more than one objects, a frequency range can be set to be processed by a super resolution algorithm so as to reduce the processing scale of the super resolution algorithm and improve the range resolution of the FCFMSIL radar significantly.

DETAILED DESCRIPTION OF THE INVENTION

Figure 1:
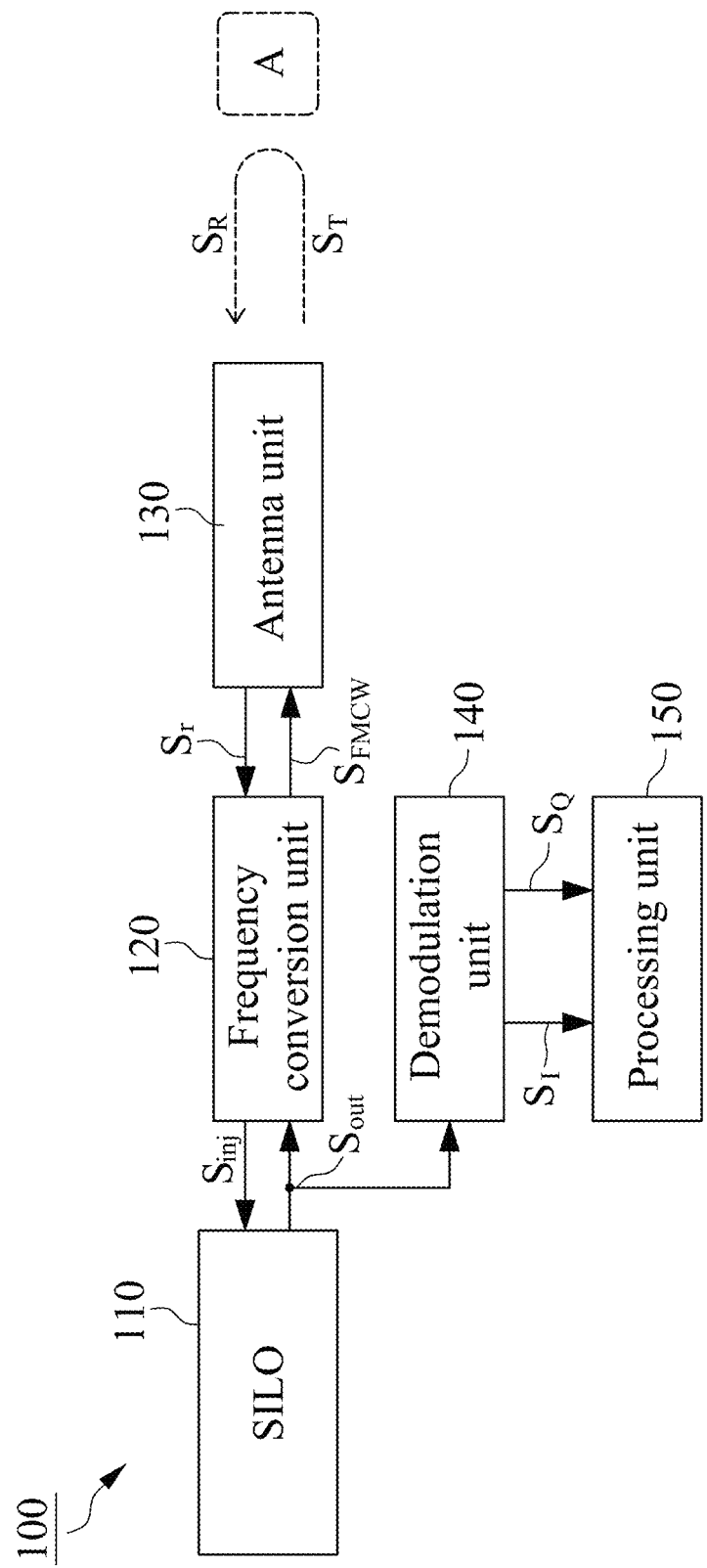
FIG. 1 is a block diagram illustrating a FCFMSIL radar in accordance with one embodiment of the present invention.

With reference to FIG. 1, a FCFMSIL radar 100 in accordance with one embodiment of the present invention includes a self-injection-locked oscillator (SILO) 110, a frequency conversion unit 120, an antenna unit 130, a demodulation unit 140 and a processing unit 150.

Figure 2:
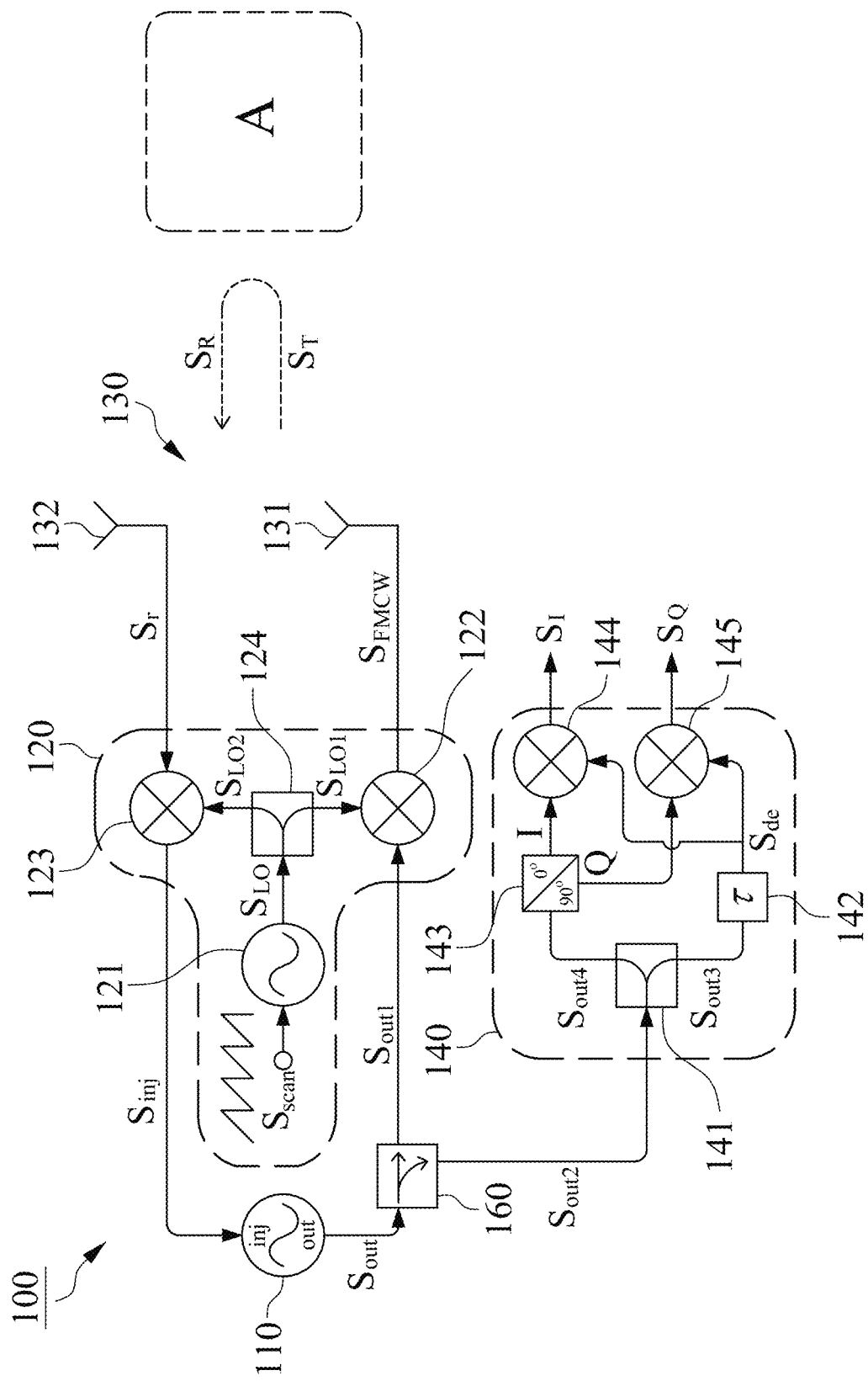
FIG. 2 is a circuit diagram illustrating a self-injection-locked oscillator, a frequency conversion unit, an antenna unit and a demodulation unit in accordance with one embodiment of the present invention.

With reference to FIGS. 1 and 2, in this embodiment, the SILO 110 is a voltage-controlled oscillator which receives a control voltage (not shown) to output an oscillation signal $S_{out}$. The oscillation signal $S_{out}$ is divided into two parts by a coupler 160. One part of the oscillation signal $S_{out1}$ is delivered to the frequency conversion unit 120, and the other part of the oscillation signal $S_{out2}$ is delivered to the demodulation unit 140.

With reference to FIG. 2, the frequency conversion unit 120 is coupled to the SILO 110 via the coupler 160 to receive and convert one part of the oscillation signal $S_{out1}$ into a frequency-modulated continuous wave signal $S_{FMCW}$. As shown in FIG. 2, the frequency conversion unit 120 includes a local oscillator (LO) 121, an up mixer 122, a down mixer 123 and a power splitter 124. The LO 121 is a voltage-controlled oscillator controlled by a received scan signal $S_{scan}$, and its output, a local oscillation signal $S_{LO}$, is a frequency-modulated signal having a frequency being varied over time. The scan signal $S_{scan}$ is a sawtooth wave in this embodiment and may be the other voltage-variable signal in time in other embodiment. The frequency of the local oscillation signal $S_{LO}$ can be given by $$\omega_{LO}(t)=\omega_{LO}+2\pi K_v V_r(t)$$

where $\omega_{LO}(t)$ denotes the frequency of the local oscillation signal $S_{LO}$, $\omega_{LO}$ denotes the center frequency of the LO 121, $K_v$ denotes the frequency tuning sensitivity of the LO 121, and $V_r(t)$ denotes the scan signal $S_{scan}$.

With reference to FIG. 2, the power splitter 124 is electrically connected to the LO 121 to receive and divide the local oscillation signal $S_{LO}$ into two parts. The up mixer 122 is electrically connected to the coupler 160 and the power splitter 124 to receive one part of the oscillation signal $S_{out1}$ and one part of the local oscillation signal $S_{LO1}$. The oscillation signal $S_{out1}$ is mixed with the local oscillation signal $S_{LO1}$ to be up-converted into the frequency-modulated continuous wave signal $S_{FMCW}$ by the up mixer 122.

With reference to FIG. 1, the antenna unit 130 is coupled to the frequency conversion unit 120 to receive and transmit the frequency-modulated continuous wave signal $S_{FMCW}$ to an area A as a transmitted signal $S_T$. As there is at least one object within the area A, the antenna unit 130 receives a reflected signal $S_R$ from the object within the area A as a received signal $S_r$. With reference to FIG. 2, the antenna unit 130 in this embodiment includes a transmit antenna 131 and a receive antenna 132. The transmit antenna 131 is electrically connected to the up mixer 122 to receive and transmit the frequency-modulated continuous wave signal $S_{FMCW}$ to the area A as the transmitted signal $S_T$, and the receive antenna 132 receives the reflected signal $S_R$ from the area A as the received signal $S_r$. The frequency of the transmitted signal $S_T$ can be given by $$\omega_{TX}(t)=\omega_{out}+\omega_{LO}(t)$$

where $\omega_{TX}(t)$ and $\omega_{out}$ are the frequencies of the transmitted signal $S_T$ and the oscillation signal $S_{out1}$, respectively.

With reference to FIG. 2, the down mixer 123 is electrically connected to the receive antenna 132 and the power splitter 124 to receive the received signal $S_r$ and the other part of the local oscillation signal $S_{LO2}$. By the down mixer 123, the received signal $S_r$ is mixed with the local oscillation signal $S_{LO2}$ to be down-converted into an injection signal $S_{inj}$, and the injection signal $S_{inj}$ is injected into the SILO 110 to make the SILO 110 enter a self-injection-locked state. The frequency of the oscillation signal $S_{out}$ generated by the SILO 110 under the self-injection-locked state can be given by $$\omega_{out}(t) = \omega_{osc} - \sum_i \omega_{LR,i}\sin\alpha_i(t)$$

where $\omega_{out}(t)$ is the oscillation signal $S_{out}$ of the SILO 110, $\omega_{osc}$ is the free oscillation frequency of the SILO 110, $\omega_{LR,i}$ is the locking range of the ith injection signal $S_{inj}$ which is reflected from the ith object and converted by the frequency conversion unit 120, $\alpha_i(t)$ is the phase difference between the ith injection signal $S_{inj}$ and the free oscillation frequency of the SILO 110.

The phase difference between the ith injection signal $S_{inj}$ and the free oscillation frequency of the SILO 110 can be given by $$\alpha_i(t) \approx \alpha_{IF}+(\omega_{TX}+2\pi K_v V_r(t))\times\tau_{s,i}(t)$$

where $\alpha_{IF}$ is the phase difference caused by the circuits of the SILO 110 and the frequency conversion unit 120, $\tau_{s,i}(t)$ is the time delay between the frequency conversion unit 120 and the antenna unit 130 and the time delay caused by the ith object. The phase difference between the SILO 110 and the frequency conversion unit 120 can be given by $$\alpha_{IF}=\omega_{osc}\times(\tau_{int,1}+\tau_{int,4})$$

where $\omega_{osc}$ is the free oscillation frequency of the SILO 110, $\tau_{int,1}$ is the delay between the SILO 110 and the up mixer 122, $\tau_{int,4}$ is the delay between the down mixer 123 and the SILO 110. The time delay between the frequency conversion unit 120 and the antenna unit 130 and the time delay caused by the ith object can be given by $$\begin{cases} \tau_{s,i}(t) = \tau_{int,2} + \tau_{int,3} + \tau_{p,i}(t) \\ \tau_{p,i}(t) = \dfrac{2(R_i + x_i(t))}{C} \end{cases}$$

where $\tau_{int,2}$ is the delay between the up mixer 122 and the transmit antenna 131, $\tau_{int,3}$ is the delay between the receive antenna 132 and the down mixer 123, $\tau_{p,i}(t)$ is the delay of the transmitted signal $S_T$ transmitted from the transmit antenna 131 to the ith object and the delay of the reflected signal $S_R$ transmitted from the ith object to the receive antenna 132, $R_i$ is the distance between the ith object and the antenna unit 130, $x_i(t)$ is the displacement of the ith object, and C is the light speed.

With reference to FIG. 1, the demodulation unit 140 is coupled to the SILO 110 via the coupler 160 to receive and thus demodulate the oscillation signal $S_{out2}$ into an in-phase demodulated signal $S_I$ and a quadrature demodulated signal $S_Q$. With reference to FIG. 2, the demodulation unit 140 of this embodiment is an IQ demodulator including a power splitter 141, a delay line 142, a quadrature power splitter 143, a first mixer 144 and a second mixer 145. The power splitter 141 is electrically connected to the coupler 160 to receive and divide the oscillation signal $S_{out2}$ into two parts. One part of the oscillation signal $S_{out3}$ is delivered to the delay line 142 and the other part of the oscillation signal $S_{out4}$ is delivered to the quadrature power splitter 143. The delay line 142 is electrically connected to the power splitter 141 to receive the oscillation signal $S_{out3}$ and output a delayed signal $S_{de}$. The quadrature power splitter 143 is electrically connected to the power splitter 141 to receive the oscillation signal $S_{out4}$ and output an in-phase signal I and a quadrature signal Q. The first mixer 144 is electrically connected to the delay line 142 and the quadrature power splitter 143 to receive the delayed signal $S_{de}$ and the in-phase signal I, and the first mixer 144 mixes the delayed signal $S_{de}$ and the in-phase signal I to output the in-phase demodulated signal $S_I$. The second mixer 145 is electrically connected to the delay line 142 and the quadrature power splitter 143 to receive the delayed signal $S_{de}$ and the quadrature signal Q, and thus mixes them to output the quadrature demodulated signal $S_Q$. The in-phase demodulated signal $S_I$ and the quadrature demodulated signal $S_Q$ are given by $$S_I(t) = E_I + E_O \cos\left[\left(\omega_{osc} - \sum_i \omega_{LR,i}\sin\alpha_i(t)\right)\tau_d\right]$$

$$S_Q(t) = E_Q - E_O \sin\left[\left(\omega_{osc} - \sum_i \omega_{LR,i}\sin\alpha_i(t)\right)\tau_d\right]$$

where $S_I(t)$ is the in-phase demodulated signal $S_I$, $S_Q(t)$ is the quadrature demodulated signal $S_Q$, $E_I$ and $E_Q$ are the DC offsets in the in-phase demodulated signal $S_I$ and the quadrature demodulated signal $S_Q$ caused by hardware imperfections, $E_0$ and $\tau_d$ are amplitude and delay provided by the delay line 142.

With reference to FIG. 1, the processing unit 150 is coupled to the demodulation unit 140 to receive and process the in-phase demodulated signal $S_I$ and the quadrature demodulated signal $S_Q$ so as to obtain a baseband signal. In this embodiment, the processing unit 150 is provided to perform arctangent demodulation on the in-phase demodulated signal $S_I$ and the quadrature demodulated signal $S_Q$, the arctangent demodulation is presented by the following equation $$S_{BB}(t) = \arctan\left(\frac{-(S_Q(t) - E_Q)}{(S_I(t) - E_I)}\right)$$
$$= \pi \cdot \text{Mod}(\omega_{osc}\tau_d, \pi) + S_b(t)$$

where $S_{BB}(t)$ is the baseband signal, $\pi \cdot \text{Mod}(\omega_{osc}T_d,\pi)$ is the phase shift correction, $S_b(t)$ is a beat signal which can be given by $$S_b(t) = \Sigma_i \omega_{LR,i}\tau_d \sin \alpha_i(t).$$

Figure 3:
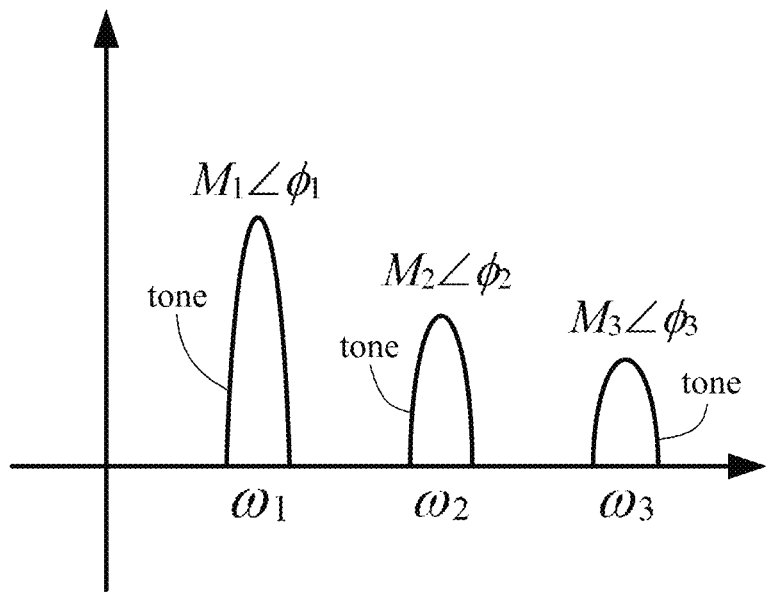
FIG. 3 shows the spectrum of a baseband signal obtained using the FCFMSIL radar in accordance with one embodiment of the present invention.

The processing unit 150 performs spectrum analysis on the beat signal of the baseband signal to acquire a phase and a frequency of at least one tone of the frequency-domain baseband signal. As shown in FIG. 3, there are three tones shown in the spectrum of the baseband signal, $\omega_1$, $\omega_2$ and $\omega_3$ are the frequencies of the three tones, respectively, and $M_1 \angle \phi_1$, $M_2 \angle \phi_2$ and $M_3 \angle \phi_3$ are the amplitude and phase of the three tones, respectively. The spectrum can be presented as follows $$S_b(\omega) = F(w(t)S_b(t))$$
$$= \frac{\tau_d}{2}\sum_i \omega_{LR,i} \times (W(\omega - \omega_{s,i})e^{j\phi_{s,i}} - W(\omega + \omega_{s,i})e^{-j(\phi_{s,i}-\pi)})$$

where $w(t)$ and $W(\omega)$ are the Fourier transform pair of window function, $\omega_{s,i}$ and $\phi_{s,i}$ are the frequency and phase of the ith tone, respectively.

The tones shown in the spectrum of FIG. 3 correspond to the phase variations of the transmitted signal $S_T$ caused by the objects in the area A. Accordingly, it can be known that there are at least three objects within the area A. However, due to the insufficient range resolution, it cannot be known that each of the tones is corresponding to one object or more than one objects.

Based on the acquired phase and frequency of each of the tones, the processing unit 150 can determine each of the tones corresponding to one or more than one objects. In this embodiment, the processing unit 150 determines each of the tones corresponding to one or more than one objects according to the relation between the phase and frequency of each of the tones. The relation equation is presented as follows $$\phi_{s,i} = 2\pi \cdot \text{Mod}\left(\alpha_{IF} + \omega_{TX}\frac{\omega_{s,i}}{\omega_B}t_s + \frac{\pi}{2}, 2\pi\right)$$

where $\phi_{s,i}$ is the phase of the ith tone, $\omega_{s,i}$ is the frequency of the ith tone, $\omega_B$ is the bandwidth of the frequency-modulated continuous wave signal $S_{FMCW}$, and $t_s$ is the period of the scan signal $S_{scan}$.

Figure 4:
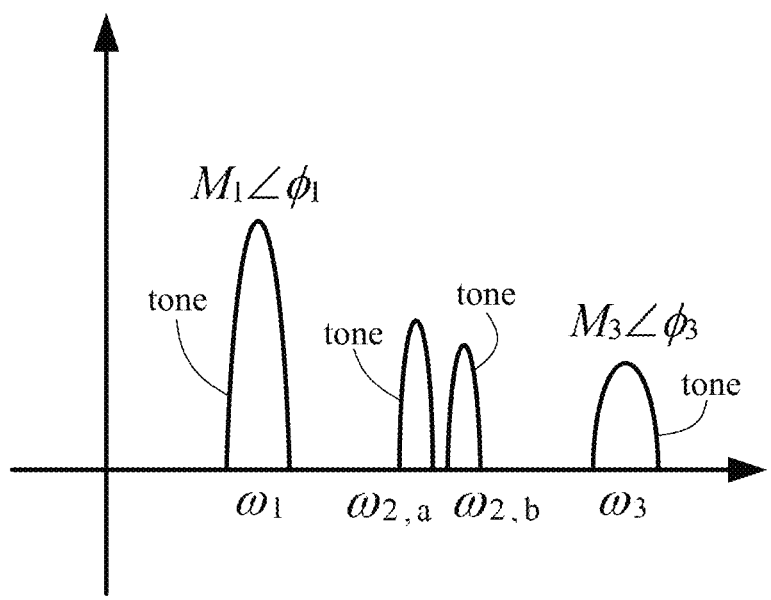
FIG. 4 shows the spectrum of the baseband signal obtained using the FCFMSIL radar in accordance with one embodiment of the present invention.

The tone is identified to be corresponding to a single object if the relation equation is satisfied. On the other hand, if the relation equation is not satisfied, the tone is identified to be corresponding to more than one objects and thus the processing unit 150 applies a super resolution algorithm to a frequency range corresponding to the tone to extract multiple tones within the frequency range. In this embodiment, the frequency range corresponding to the tone is defined between the sum and difference of the frequency of the tone and a predetermined frequency value (the frequency of the tone±the predetermined frequency value). For example, as there is a tone, whose frequency and phase not satisfy the relation equation, having a frequency of 327 Hz shown in the spectrum, the processing unit 150 is designed to apply a super resolution algorithm to the frequency range between 227 Hz and 427 Hz (327 Hz±100 Hz) so as to substantially improve the Fourier transform resolution. FIG. 4 is the spectrum obtained by applying a super resolution algorithm to the frequency range, it can be seen that there are two tones acquired within the frequency range so total four objects are detected in the area A.

Preferably, the processing unit 150 can evaluate the displacement of the object based on the phase variation of the same frequency location (the frequency of the tone corresponding to the object) in the frequency sweep intervals. As the displacement of the object is caused by vital sign, it can be presented as the physiological signal of the object.

In another condition, even though there is only one object in the area A, the spectrum may show two tones due to the leakage between the transmit antenna 131 and the receive antenna 132. Nevertheless, it is possible to know that one of the tones is corresponding to one or more than one objects by the relation of the phase and frequency of the two tones. The relation equation is presented as follows $$\phi_{s,ij} = \phi_{s,i} - \phi_{s,j} = 2\pi \cdot \text{Mod}\left(\omega_{TX}\frac{\omega_{s,ij}}{\omega_B}t_s, 2\pi\right)$$

where $\phi_{s,ij}$ is a phase difference between the ith tone and the jth tone, $\phi_{s,i}$ is the phase of the ith tone $\phi_{s,j}$ is the phase of the jth tone, $\omega_{s,ij}$ is a frequency difference between the ith tone and the jth tone and given by $\omega_{s,ij}=\omega_{s,i}-\omega_{s,j}$, $\omega_{s,i}$ is the frequency of the ith tone, $\omega_{s,j}$ is the frequency of the jth tone, $t_s$ is a period of the scan signal $S_{scan}$, $\omega_3$ is a bandwidth of the frequency-modulated continuous wave signal $S_{FMCW}$.

Similarly, the tone is corresponding to a single object when the equation is satisfied and corresponding to more than one objects when the equation is not satisfied. And the processing unit 150 can perform a super resolution algorithm to a frequency range corresponding to the tone whose phase and frequency dissatisfy the equation so as to extract more than one tones in the frequency range and thus confirm the number of objects within the area A.

The processing unit 150 of the present invention is provided to perform a spectrum analysis on the baseband signal to acquire the frequency and phase of each of the tones in the frequency-domain baseband signal. As a result, it can be known whether each of the tones is corresponding to a single object based on the relation between the frequency and phase of each of the tones. If the result shows that the tone is corresponding to multiple objects, the processing unit 150 establish a frequency range for processing of a super resolution algorithm so as to decrease data volume of the super resolution algorithm and increase operational efficiency and correct rate, and further improve the range resolution of the FCFMSIL radar 100 of the present invention.

The scope of the present invention is only limited by the following claims. Any alternation and modification without departing from the scope and spirit of the present invention will become apparent to those skilled in the art.

What is claimed is:

1. A frequency-converted frequency-modulated self-injection-locked (FCFMSIL) radar comprising:
    a self-injection-locked oscillator (SILO) configured to output an oscillation signal;
    a frequency conversion unit coupled to the SILO and configured to receive and convert the oscillation signal into a frequency-modulated continuous wave (FMCW) signal;
    an antenna unit coupled to the frequency conversion unit, configured to receive and transmit the FMCW signal to an area as a transmitted signal and configured to receive a reflected signal from the area as a received signal, the frequency conversion unit is configured to receive the received signal, convert the received signal into an injection signal, and inject the injection signal into the SILO to make the SILO enter a self-injection-locked state;
    a demodulation unit coupled to the SILO and configured to receive and demodulate the oscillation signal into an in-phase demodulated signal and a quadrature demodulated signal; and
    a processing unit coupled to the demodulation unit, configured to receive and process the in-phase demodulated signal and the quadrature demodulated signal to obtain a baseband signal, configured to perform a spectrum analysis on the baseband signal to acquire a phase and a frequency of at least one tone of the frequency-domain baseband signal, and configured to determine the at least one tone is corresponding to one object or a plurality of objects based on the phase and the frequency of the at least one tone.

2. The FCFMSIL radar in accordance with claim 1, wherein the frequency conversion unit includes:
    a local oscillator (LO);
    an up mixer; and
    a down mixer,
    wherein the LO is configured to output a local oscillation signal, the up mixer is electrically connected to the SILO and the LO, and configured to receive the oscillation signal and the local oscillation signal, and up-convert the oscillation signal into the FMCW signal using the local oscillation signal, the down mixer is electrically connected to the antenna unit, the LO and the SILO, and configured to receive the received signal and the local oscillation signal, and down-convert the received signal into the injection signal using the local oscillation signal and inject the injection signal into the SILO.

3. The FCFMSIL radar in accordance with claim 2, wherein the LO is a voltage-controlled oscillator configured to receive and be controlled by a scan signal.

4. The FCFMSIL radar in accordance with claim 3, wherein the processing unit is configured to determine the at least one tone of the baseband signal is corresponding to one or a plurality of objects based on a relation equation of the phase and the frequency of the at least one tone of the baseband signal, the relation equation is presented as follows $$\phi_{s,i} = 2\pi \cdot \mathrm{Mod}\!\left(\alpha_{IF} + \omega_{TX}\frac{\omega_{s,i}}{\omega_B}t_s + \frac{\pi}{2}, 2\pi\right)$$

wherein $\phi_{s,i}$ is the phase of the ith tone, $\alpha_{IF}$ is a phase difference caused by circuits of the SILO and the frequency conversion unit and given by $\alpha_{IF}=\omega_{osc}\times(\tau_{int,1}+\tau_{int,4})$, $\omega_{osc}$ is a free oscillation frequency of the SILO, $\tau_{int,1}$ is a delay between the SILO and the up mixer, $\tau_{int,4}$ is a delay between the down mixer and the SILO, $\omega_{s,i}$ is the frequency of the ith tone, $\omega_B$ is a bandwidth of the FMCW signal, $\omega_{TX}$ is a frequency of the transmitted signal and given by $\omega_{TX}=\omega_{LO}+\omega_{out}$, $\omega_{LO}$ is a frequency of the local oscillation signal, $\omega_{out}$ is a frequency of the oscillation signal, $t_s$ is a period of the scan signal.

5. The FCFMSIL radar in accordance with claim 3, wherein the processing unit is configured to determine one of two tones is corresponding to one or a plurality of objects based on a relation equation of the phases and the frequencies of the two tones, the relation equation is presented as follows $$\phi_{s,ij} = \phi_{s,i} - \phi_{s,j} = 2\pi \cdot \mathrm{Mod}\!\left(\omega_{TX}\frac{\omega_{s,ij}}{\omega_B}t_s, 2\pi\right)$$

wherein $\phi_{s,ij}$ is a phase difference between the ith tone and the jth tone, $\phi_{s,i}$ is the phase of the ith tone, $\phi_{s,j}$ is the phase of the jth tone, $\omega_{s,ij}$ is a frequency difference between the ith tone and the jth tone and given by $\omega_{s,ij}=\omega_{s,i}-\omega_{s,j}$, $\omega_{s,i}$ is the frequency of the ith tone, $\omega_{s,j}$ is the frequency of the jth tone, $t_s$ is a period of the scan signal, $\omega_D$ is a bandwidth of the FMCW signal, $\omega_{TX}$ is a frequency of the transmitted signal and given by $\omega_{TX}=\omega_{LO}+\omega_{out}$, $\omega_{LO}$ is a frequency of the local oscillation signal, and $\omega_{out}$ is a frequency of the oscillation signal.

6. The FCFMSIL radar in accordance with claim 2, wherein the frequency conversion unit includes a power splitter which is electrically connected to the LO and configured to receive and divide the local oscillation signal into two parts, the up mixer is configured to receive one part of the local oscillation signal, and the down mixer is configured to receive the other part of the local oscillation signal.

7. The FCFMSIL radar in accordance with claim 2, wherein the antenna unit includes:
    a transmit antenna electrically connected to the up mixer and configured to receive and transmit the FMCW signal as the transmitted signal; and
    a receive antenna, electrically connected to the down mixer, and configured to receive the reflected signal as the received signal and deliver the received signal to the down mixer.

8. The FCFMSIL radar in accordance with claim 2 further comprising a coupler, wherein the coupler is electrically connected to the SILO and configured to receive and divide the oscillation signal into two parts, the up mixer of the frequency conversion unit is configured to receive one part of the oscillation signal, and the demodulation unit is configured to receive the other part of the oscillation signal.

9. The FCFMSIL radar in accordance with claim 8, wherein the demodulation unit includes:
- a power splitter electrically connected to the coupler and configured to receive and divide the oscillation signal into two parts;
- a delay line electrically connected to the power splitter and configured to receive one part of the oscillation signal and output a delayed signal;
- a quadrature power splitter electrically connected to the power splitter, and configured to receive the other part of the oscillation signal and output an in-phase signal and a quadrature signal;
- a first mixer electrically connected to the delay line and the quadrature power splitter, and configured to receive the delayed signal and the in-phase signal and output the in-phase demodulated signal; and
- a second mixer electrically connected to the delay line and the quadrature power splitter, and configured to receive the delayed signal and the quadrature signal and output the quadrature demodulated signal.

10. The FCFMSIL radar in accordance with claim 1, wherein the processing unit is configured to apply a super resolution algorithm to a frequency range corresponding to the at least one tone to acquire a plurality of tones in the frequency range when the processing unit determines the at least one tone is corresponding to a plurality of objects, and the frequency range corresponding to the at least one tone is defined between a sum and a difference of the frequency of the at least one tone and a predetermined frequency value.

* * * * *